United States Patent
Vig et al.

(10) Patent No.: US 6,690,155 B2
(45) Date of Patent: Feb. 10, 2004

(54) MAGNETIC GEAR TOOTH SENSOR WITH HALL CELL DETECTOR

(75) Inventors: Ravi Vig, Bow, NH (US); Alberto Bilotti, Florida (AR); Pablo Javier Bolsinger, Buenos Aires (AR)

(73) Assignee: Allegro Microsystems, Inc., Worcester, MA (US)

( * ) Notice: Subject to any disclaimer, the term of this patent is extended or adjusted under 35 U.S.C. 154(b) by 51 days.

(21) Appl. No.: 10/105,897

(22) Filed: Mar. 25, 2002

(65) Prior Publication Data

US 2003/0178989 A1 Sep. 25, 2003

(51) Int. Cl.[7] .............................. G01B 7/30; G01P 3/48; G01P 3/489
(52) U.S. Cl. ................ 324/207.12; 324/166; 324/207.2; 324/225
(58) Field of Search .................. 324/207.12, 207.2, 324/207.21, 207.25, 225, 251, 166; 257/421, 427; 438/3, 48; 702/94, 104

(56) References Cited

U.S. PATENT DOCUMENTS

| | | | | |
|---|---|---|---|---|
| 4,293,814 A | * | 10/1981 | Boyer | 324/166 |
| 4,992,731 A | * | 2/1991 | Lorenzen | 324/174 |
| 5,389,889 A | | 2/1995 | Towne et al. | 330/6 |
| 5,442,283 A | | 8/1995 | Vig et al. | 324/207.2 |
| 5,517,112 A | * | 5/1996 | Vig et al. | 324/251 |
| 5,532,583 A | * | 7/1996 | Davis et al. | 324/202 |
| 5,581,179 A | | 12/1996 | Engel et al. | 324/207.2 |
| 5,621,319 A | | 4/1997 | Bilotti et al. | 324/251 |
| 5,650,719 A | | 7/1997 | Moody et al. | 324/166 |
| 5,694,038 A | * | 12/1997 | Moody et al. | 324/207.2 |
| 5,777,465 A | * | 7/1998 | Walter | 324/166 |
| 5,917,320 A | | 6/1999 | Scheller et al. | 324/166 |
| 6,064,199 A | * | 5/2000 | Walter et al. | 324/207.2 |
| 6,091,239 A | | 7/2000 | Vig et al. | 324/207.2 |
| 6,232,768 B1 | | 5/2001 | Moody et al. | 324/207.12 |
| 6,242,908 B1 | | 6/2001 | Scheller et al. | 324/207.2 |
| 6,252,735 B1 | * | 6/2001 | Chung et al. | 360/67 |
| 6,285,958 B1 | * | 9/2001 | Wolf et al. | 702/87 |
| 6,297,627 B1 | | 10/2001 | Towne et al. | 324/207.12 |

FOREIGN PATENT DOCUMENTS

JP 60042666 A * 3/1985 ......... G01R/33/025

OTHER PUBLICATIONS

Bilotti et al. "Monolithic Magnetic Hall Sensor Using Dynamic Quadrature Offset Cancellation," IEEE Journal of Solid–State Circuits, vol. 32, No. 6, Jun. 1997, pp. 829–836.*

* cited by examiner

*Primary Examiner*—N. Le
*Assistant Examiner*—Darrell Kinder
(74) *Attorney, Agent, or Firm*—Daly, Crowley & Mofford, LLP

(57) ABSTRACT

A sensor includes a Hall cell and a compensation circuit for subtracting a magnet background field from the Hall cell output to provide a signal corresponding to rotations of a toothed ferrous gear.

16 Claims, 6 Drawing Sheets

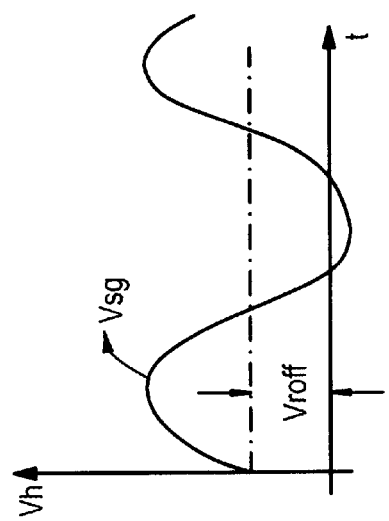
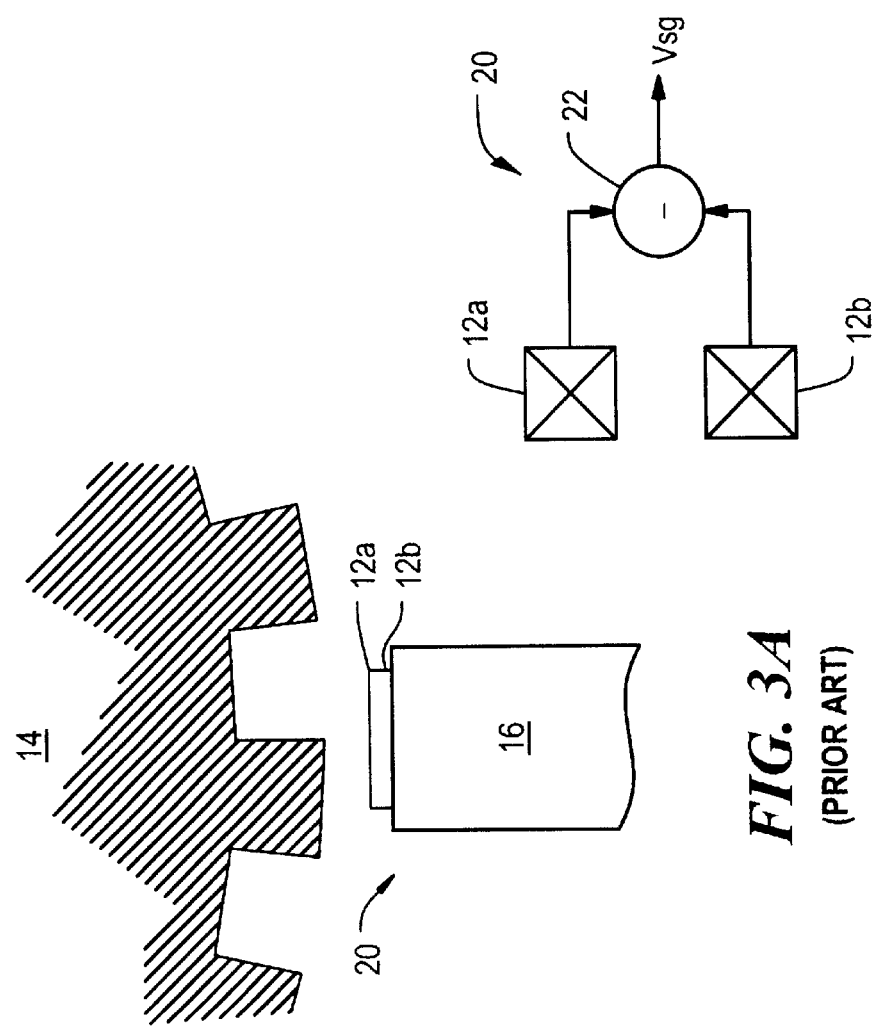
FIG. 3C (PRIOR ART)
FIG. 3B (PRIOR ART)
FIG. 3A (PRIOR ART)

MAGNETIC GEAR TOOTH SENSOR WITH HALL CELL DETECTOR

CROSS REFERENCE TO RELATED APPLICATIONS

Not Applicable.

STATEMENT REGARDING FEDERALLY SPONSORED RESEARCH

Not Applicable.

FIELD OF THE INVENTION

The present invention relates generally to sensors and, more particularly, to sensors having Hall cells for detecting rotations of a ferrous gear.

BACKGROUND OF THE INVENTION

As is well known in the art, integrated gear tooth sensors using Hall cells and rotating targets are widely used in electronic automotive systems and many other such systems. In typical applications where an accurate detection of the tooth position is required, the Hall cell output is processed by relatively sophisticated electronics in order to cancel various distortive effects, such as offsets, temperature changes, airgap variations, production tolerances, and the like.

As shown in the prior art arrangement of FIG. 1, an integrated circuit sensor 10 can include a Hall cell 12 in proximity to a ferrous gear 14. The Hall cell 12 is attached to one pole face, e.g., N, of a magnet 16. The gear 14 rotates in close proximity to the Hall cell 12 such that the relatively strong field 18 of the magnet 16 or "background field" is weakly modulated by the airgap variations corresponding to the alternating tooth/valley perimeter of the rotating gear 14. The resultant signal variations reflect the gear 14 rotations as the Hall cell 12 generates a relatively small alternating signal voltage $v_{sg}$ embedded in the undesirable, relatively large direct current (DC) background signal $V_{bf}$, as shown in FIG. 2.

As is well known in the art, as much of the background signal $V_{bf}$ as possible is removed for accurate processing of the signal $v_{sg}$ generated by rotation of the ferrous gear 14. Since the gear rotating frequency can vary within large limits including DC values, removing the background field signal $V_{bf}$ by frequency discrimination is generally not practical.

FIGS. 3A–C show a common conventional sensor 20 arrangement for canceling the background field $V_{bf}$. In general, the prior art sensor 20 includes first and second Hall cells 12a, 12b coupled in a differential arrangement as shown in FIG. 3B. A subtractor 22 receives signals from the first and second Hall cells 12a,b and outputs the difference signal $V_{sg}$ between the two signals. If the Hall cells 12a,b are properly spaced as compared to the tooth spacing on the gear 14, the difference voltage $V_{sg}$ between the two Hall cells 12a,b produces the desired signal variations while the background field $V_{bf}$ is cancelled for the most part. Due to assembly imbalances and Hall cell offsets, the signal at the subtractor 22 output includes a residual offset $V_{roff}$ (FIG. 3C) that can reach five to ten percent or more of the background signal $V_{bf}$. To further reduce the residual offset $V_{roff}$, known sensors require additional sophisticated electronic processing or costly trimming techniques.

It would, therefore, be desirable to overcome the aforesaid and other disadvantages by providing a sensor having a Hall cell that eliminates the need to correct for assembly imbalances and associated offsets. It would further be desirable to provide a sensor that is more economical than conventional sensor arrangements.

SUMMARY OF THE INVENTION

The present invention provides a Hall sensor with a subtractor circuit that removes a magnetic background field from a signal that is modulated by airgap variations from a rotating ferrous gear. With this arrangement, the need for differential Hall cells is eliminated. While the invention is primarily shown and described in conjunction with a Hall cell detecting rotations of a toothed ferrous wheel, it is understood that the invention is applicable to Hall sensors in general in which it is desirable to remove a background signal.

In one aspect of the invention, a sensor includes a Hall cell and a compensation circuit providing respective inputs to a subtractor circuit. The Hall cell output signal provided to the subtractor circuit includes a first component corresponding to a background field and a second component corresponding to air gap variations detected by the Hall cell. The compensation circuit output signal to the subtractor circuit cancels the background field signal component in the Hall cell output signal. Thus, the remaining signal corresponds to the second component of the Hall cell output, i.e., the detected air gap variations, which can be generated by teeth on a rotating ferrous gear.

In one particular embodiment, the compensation circuit includes a comparator circuit receiving an amplified subtractor output signal and a threshold signal. The comparator output is gated with a clock signal and the output is provided to a counter having outputs coupled to a digital-to-analog converter (DAC), which outputs an analog signal to the subtractor. The counter increments until the comparator output stops the clock signal from changing the counter value. After initialization, the signal from the DAC to the subtractor increases until reaching a steady state corresponding to the background field as determined by the comparator. The subtractor then outputs the signal corresponding to gear rotation with the background field signal removed.

BRIEF DESCRIPTION OF THE DRAWINGS

The invention will be more fully understood from the following detailed description taken in conjunction with the accompanying drawings, in which:

FIG. 3A is a pictorial representation of a prior art sensor having first and second Hall cells coupled in a differential arrangement;

FIG. 3B is a schematic representation of the prior art sensor of FIG. 3A;

FIG. 3C is a graphical depiction of signal strength over time for the prior art sensor of FIG. 3A;

DETAILED DESCRIPTION OF THE INVENTION

Figure 1:
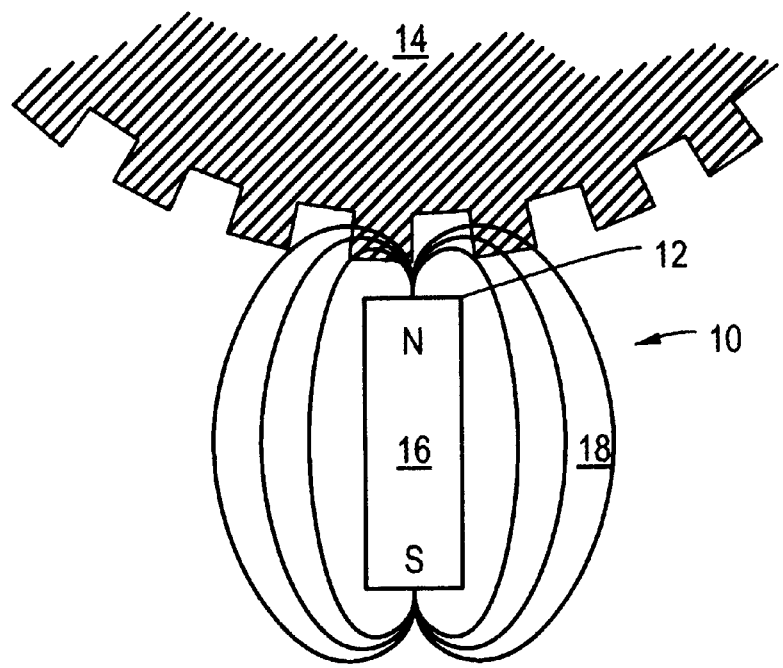
FIG. 1 is a pictorial representation of a prior art Hall sensor for detecting rotations of a ferrous gear.
Figure 2:
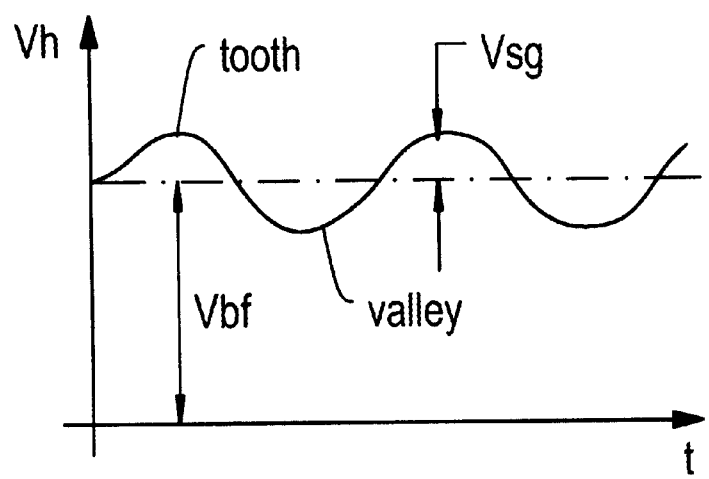
FIG. 2 is a graphical depiction of signal strength over time for the prior art Hall sensor of FIG. 1.
Figure 4:
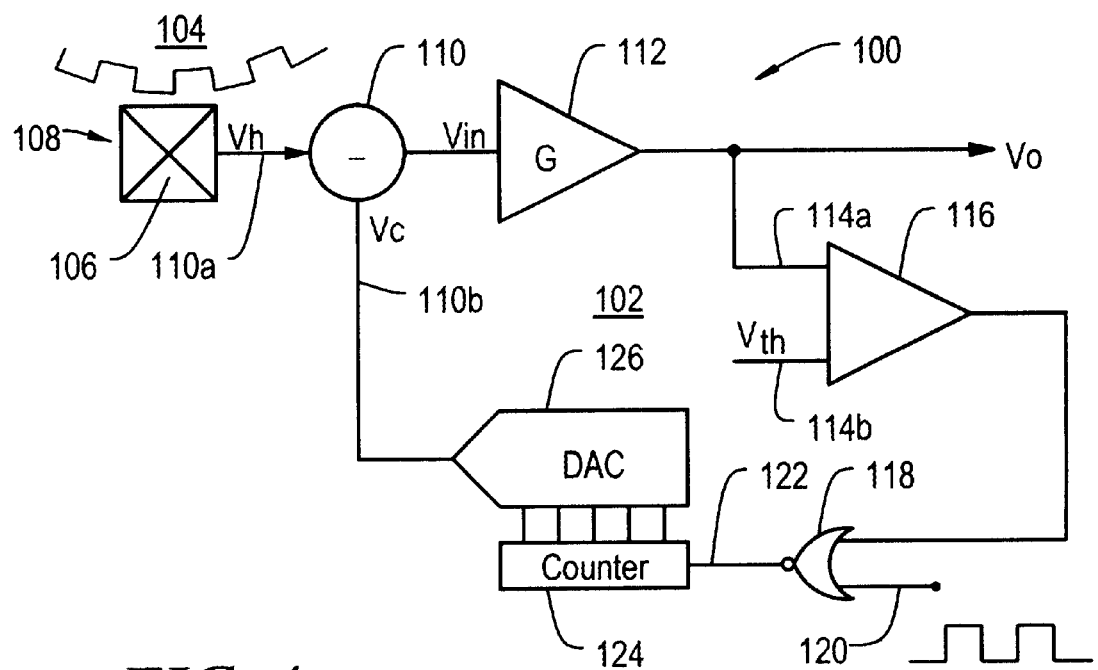
FIG. 4 is a schematic representation of a Hall cell sensor in accordance with the present invention.

FIG. 4 shows an exemplary Hall cell sensor 100 having a compensation circuit 102 for removing a background signal from a signal generated by a rotating ferrous gear 104 in accordance with the present invention. In general, the sensor 100 cancels, e.g., subtracts, the magnetic or background field generated by a magnet 106 within a Hall cell 108 from a signal containing the background signal and a signal detected by the Hall cell as the gear 104 rotates. The rotating gear 104, by periodically varying the airgap between the magnet 106 and the gear with its tooth/valley perimeter, modulates the magnetic field of the magnet such that the Hall cell 108 outputs an alternating voltage superimposed on the relatively large DC voltage background field.

Figure 5:
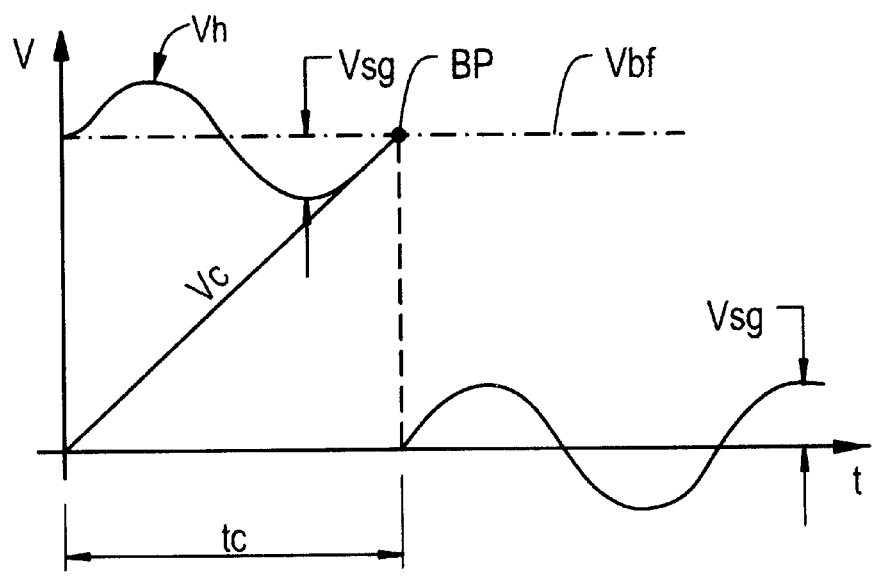
FIG. 5 is a graphical depiction of voltage over time for an exemplary sensor having background field cancellation in accordance with the present invention.

As shown in FIG. 5, the Hall cell output voltage $V_h$ includes a relatively large DC voltage $V_{bf}$ component due to the background field and a relatively small signal voltage $v_{sg}$ component generated by the tooth/valley airgap variations. As described in detail below, after a compensation circuit signal $V_c$ reaches a balance point BP, the background signal $V_{bf}$ can be subtracted out leaving the small signal voltage $v_{sg}$.

Referring again to the exemplary embodiment of FIG. 4, the compensation circuit 102 includes a subtractor 110 that receives at a first input 110a the output signal $V_h$ from the Hall cell 106 and a compensation signal $V_c$. The subtractor output signal $V_{in}$ is amplified by an amplifier 112, which provides an output voltage $V_o$. In one particular embodiment, the amplifier output voltage signal $V_o$ is provided to a first input 114a of a comparator 116, which also receives a predetermined threshold voltage $V_{th}$ at a second input 114b. In one particular embodiment, the threshold voltage $V_{th}$ at the second comparator input 114b is set to zero Volts.

A logic circuit 118, here shown as a NOR gate, receives the comparator output signal and a clock signal 120. The NOR output signal 122 is coupled to the clock signal input of a counter circuit 124, which increments (or decrements) each clock cycle. A Digital-to-Analog Converter (DAC) 126 receives the digital value from the counter 124 and provides a converted analog compensation signal $V_c$ to a second input 110b of the subtractor 110.

In operation, the clock signal 120 initially passes through the NOR gate 118 and increments the counter 124 so as to increase the level of the compensation signal $V_c$ to the second input of the subtractor 110. When the subtractor output reaches a level sufficient to change the output state of the comparator 116, the counter 124 stops increasing and the DAC 126 signal output $V_c$ to the subtractor 110 reaches a steady state.

Looking now to FIG. 5 in conjunction with FIG. 4, the compensating voltage signal $V_c$ from the DAC 126 is subtracted from the Hall cell output signal $V_h$ after turn on, until full cancellation of the background signal $V_{bf}$ is achieved after a time $t_c$ leaving the small signal voltage $v_{sg}$. At this time, the comparator 116 output changes state when the amplifier 112 output voltage $V_o$ is no longer greater than zero. The change in output state blocks the clock signal 120 through the NOR gate 118 and, thereby stops the counter 124 from incrementing. The DAC/counter stores the latest compensating voltage $V_c$ value until the next turn-on. With this arrangement, the DC background field voltage signal $V_{bf}$ is removed using only one Hall cell.

As shown and described above, the amplifier input voltage $v_{in}$ (subtractor output voltage) is the difference between the Hall cell output voltage $v_h$ and the compensating voltage $V_c$. In one embodiment, the compensating voltage $V_c$, after turn on, ramps up steadily from a zero level until reaching the Hall cell output voltage $V_h$. When the voltages are equal, i.e, $v_c=v_h$, the amplifier output $v_o$ is zero, and the comparator 116, which receives the amplifier output voltage $v_o$ and a threshold voltage $V_{th}$, changes output state so as to prevent clock pulses from reaching the counter 124. The DAC 126 then maintains the last voltage level generated and provides this signal to the subtractor 110.

EXAMPLE

In a typical gear tooth sensor using ferrous targets and operating at relatively low levels background fields of about 3 kG and signals of about 100 Gpp (peak-to-peak) are found. With Hall cells having a sensitivity of about 20 $\mu$V/G, the Hall cell produces a background dc voltage of about 60 mV plus a useful signal of 2 mVpp. In this example, once the compensation voltage $V_c$ reaches about 60 mV, the comparator 116 changes output state, the data remains stored in the counter 124 and a steady state voltage of 60 mV is applied to the subtractor 110.

Figure 6:
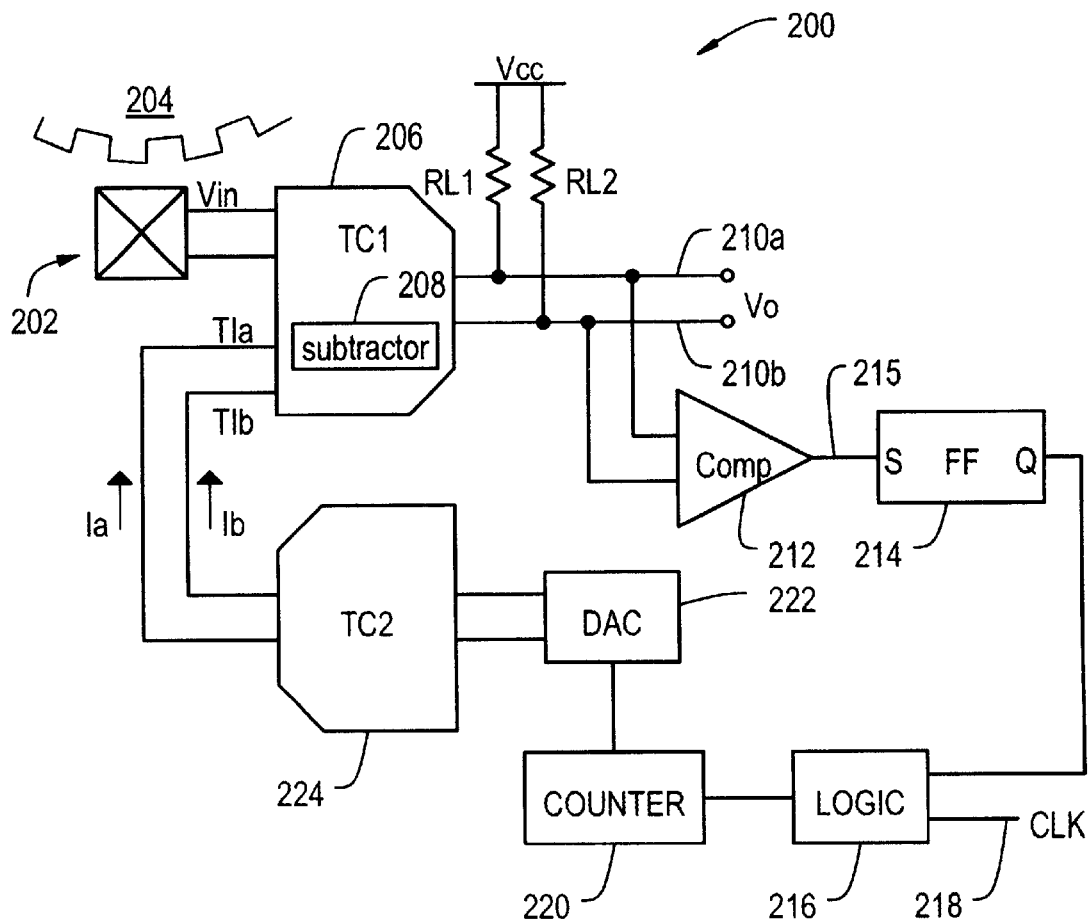
FIG. 6 is a schematic representation showing further details of an exemplary sensor having background field cancellation in accordance with the present invention.

FIG. 6 shows a further embodiment of a Hall cell sensor 200 that cancels a magnet background signal from a signal generated by Hall cell 202 proximate a rotating ferrous gear 204 in accordance with the present invention. A Hall cell 202 provides a differential signal to a first differential transconductor 206, which includes a subtractor circuit 208, such as the subtractor circuit 110 of FIG. 4. First and second load resistances RL1, RL2 can be coupled to the respective differential outputs 210a, b, which provide the output voltage $v_o$ to a comparator 212. A flip flop circuit 214 is coupled to the comparator output 215 and a logic circuit 216, such as a NOR gate, receives a clock signal 218 and the flip flop output signal Q. The logic circuit 216 output is coupled to a counter 220 to which a DAC 222 is connected. A second differential transconductor 224 receives the DAC output 222 and provides a differential current Ia, Ib to the first transconductor 206.

The difference between the current signals Ia, Ib entering at first and second terminals T1a, T1b of the first transconductor 206 produces a compensation voltage $v_c$, which is subtracted by the subtractor circuit 208 from the input voltage $v_h$, as described below. The DAC 222 output voltage controls the differential current Ia, Ib via the second differential transconductor 224.

The comparator 212 detects the balance condition when the differential output voltage goes through zero, generating a hold signal that is stored in the flip flop 214, which blocks the clock signal 218 from the counter 220. It is understood that the differential transconductors 206, 224 provide enhanced linear amplification of relatively large input signals.

Figure 7:
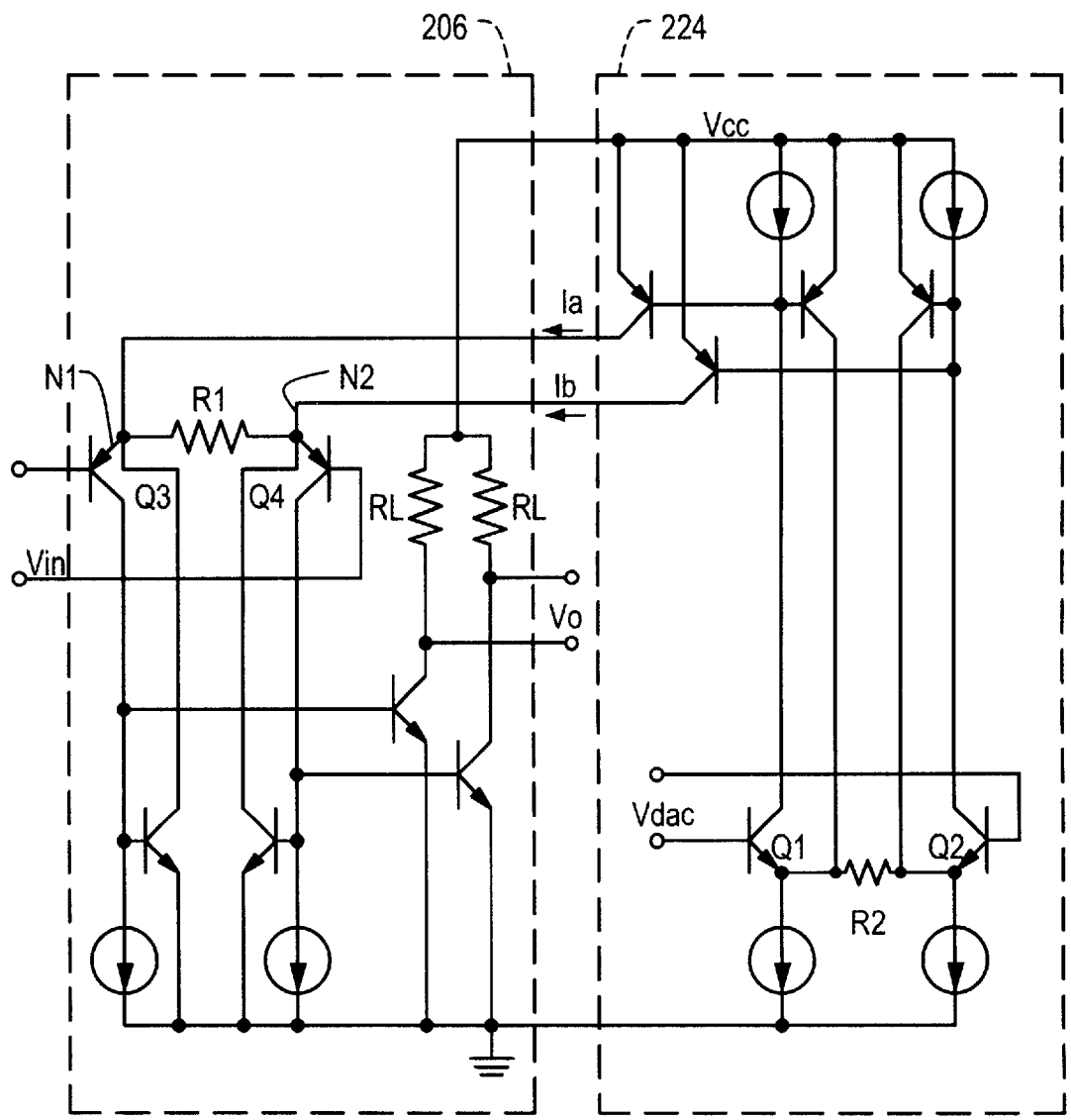
FIG. 7 is a further schematic representation showing additional details of an exemplary sensor having background field cancellation in accordance with the present invention.

FIG. 7 shows an exemplary circuit implementation of the first and second differential transconductors 206, 224. The first (amplifying) transconductor 206 operates with bias currents Ia, Ib, which are generated by the second (mirror)

transconductor 224. The differential bias current Ia–Ib from the second transconductor 224 corresponds to an output voltage $V_{DAC}$ divided by the value of a resistor R2 coupled across emitter terminals of first and second mirror transistors Q1, Q2, i.e., $V_{DAC}/R2$. Straightforward circuit analysis at first and second nodes N1, N2 of the first transconductor 206 gives an amplifier gain equal to the load resistors RL divided by the value of the resistor coupled between emitter terminals of third and fourth transistors Q3, Q4 of the first transconductor, i.e., 2RL/R1 and the output compensation voltage becomes Vc=2(Ia–Ib)RL, which is equivalent to Vc=[$2V_{DAC}$RL]/R2.

It is understood that the signal at the subtractor output, which is identical to the signal at the amplifier output $v_o$ except for a gain factor, shows some residual offset due to the fact that the cancelled signal is not the true background voltage but rather the sum of the background voltage and the signal voltage. This offset depends on the instantaneous value of the Hall cell output voltage $v_h$ at the time cancellation ($v_h=v_c$) occurs, which triggers the flip-flop circuit FF.

Figure 8A:
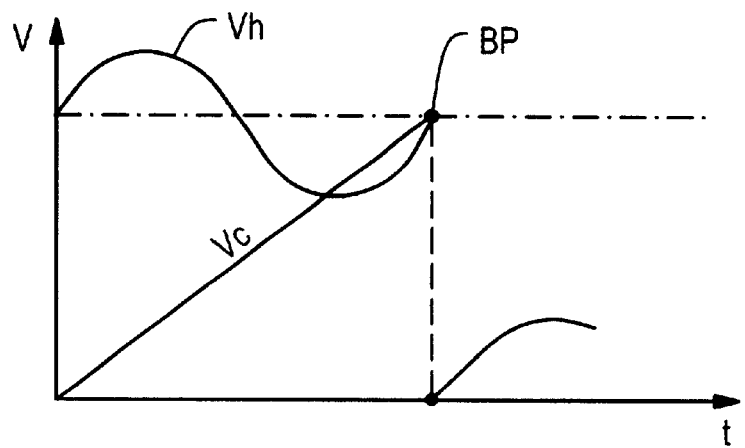
FIGS. 8A–C are graphical snapshot representations of voltages over time for an exemplary sensor having background field cancellation in accordance with the present invention.
Figure 8B:
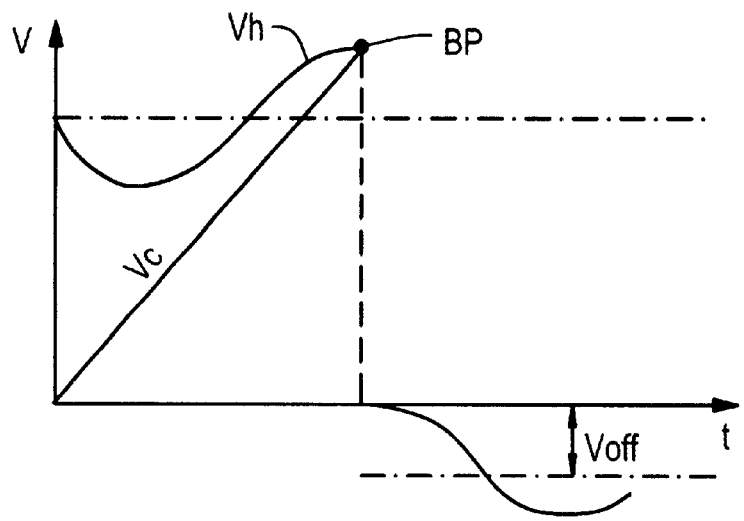
Figure 8C:
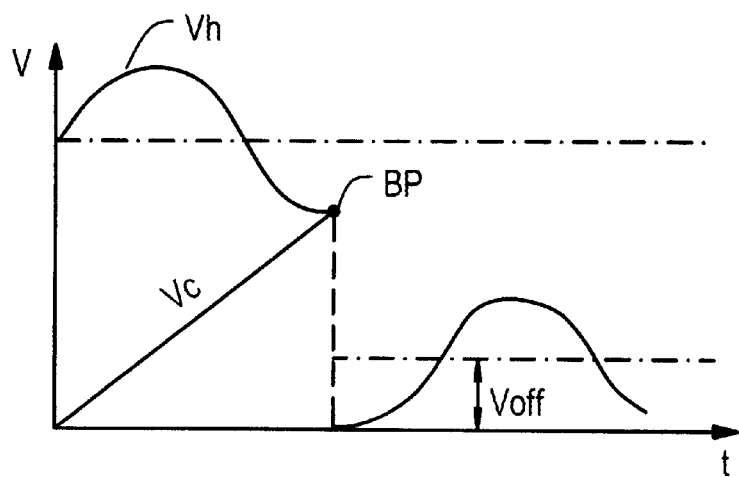

FIG. 8A shows the case where the hall cell output signal $v_h$ is equal to the background field $V_{bf}$ at the balance point BP ($v_h=v_c$) giving rise to a centered waveform at the subtractor output. FIG. 8B shows one extreme case where the subtractor output signal is maximum at the balance point BP, for example when a tooth is just facing the Hall cell. The subtractor output includes a negative offset voltage $V_{off}$. FIG. 8C shows the converse extreme when the subtractor output signal is minimum for the case of a gear valley facing the Hall cell producing a positive offset voltage $V_{off}$.

From the above it can be seen that the residual offset $V_{off}$ after compensation can range between about $-v_{sg}$(p–p)/2 to about $+v_{sg}$(p–p)/2. This offset is relatively well behaved as the critical ratio $|V_{roff}|/v_{sg}$(p–p) can never be higher than 0.5. This is in contrast to ratios that are 5 to 10 times higher in prior art differential cancellation systems when operating at low levels.

It is understood that the background signal canceling technique of the present invention can be readily adapted for canceling negative or positive background fields by adjusting the DAC range such that the compensating voltage starts at the most negative value of $V_{bf}$ and extends up to the most positive value of $V_{bf}$. In addition, one of ordinary skill in the art will recognize that cancellation can be performed not only at startup when $v_{sg}$ is approximately a dc voltage but under a running target.

As is well known to one of ordinary skill in the art, the sensitivity of Hall cells, particularly when fed from a constant voltage source, shows a well known temperature dependence. After compensation of the background field $V_{bf}$, the temperature dependence can remain unchanged by providing the compensation voltage $V_c$ with a similar temperature dependence. This can be readily achieved by properly controlling the temerance dependence of the DAC output voltage.

In contrast with prior art differential Hall cell sensors, such as that shown in FIG. 3, the inventive Hall sensor requires one Hall cell. One of ordinary skill in the art will readily appreciate the comparative advantages in chip area and current consumption, as well as the elimination of offsets for assembly imbalances. Further advantages accrue since the inventive sensor performance is immune to angle deviations in the gear rotating plane and to gear tooth to tooth spacing.

Various modifications and/or substitutions to the particular embodiments shown and described herein will be readily apparent to one of ordinary skill in the art. For example, while illustrative circuits, such as NOR gates and counters are used herein, a variety of other circuit arrangements well known to one of ordinary skill in the art can be used to meet the needs of a particular application. In addition, a range of analog and digital circuit configurations different from the illustrative embodiments described herein can be used without departing from the invention.

One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. A sensor, comprising:
   a Hall cell for providing an output signal having a first signal component corresponding to a background field from a magnet and a second signal component corresponding to rotations of a ferrous gear; and
   a compensation circuit coupled to the Hall cell, the compensation circuit including a subtractor for subtracting a steady state compensation signal corresponding to the background field signal from the Hall cell output signal, the compensation circuit further including a counter circuit for providing the compensation signal by counting up until the compensation signal reaches a level corresponding to the background field.

2. The sensor according to claim 1 wherein the compensation circuit further includes a digital-to-analog circuit coupled to the counter for converting a value of the counter to an analog signal.

3. The sensor according to claim 2, wherein the compensation circuit further includes a comparator coupled to the counter via a logic circuit wherein the comparator has an output that changes an output state when the subtractor output reaches a predetermined threshold.

4. The sensor according to claim 3, wherein compensation circuit further includes a flip-flop circuit coupled to the comparator.

5. The sensor according to claim 3, wherein the compensation circuit further includes an amplifier coupled to the subtractor output.

6. The sensor according to claim 3, wherein the compensation circuit further includes a first differential transconductance amplifier coupled to the Hall cell.

7. The sensor according to claim 6, wherein the first transconductance amplifier includes the subtractor circuit.

8. The sensor according to claim 7, wherein the compensation circuit further includes a second transconductance amplifier coupled to the digital-to-analog circuit.

9. The sensor according to claim 1, wherein the sensor includes a single Hall cell.

10. A Hall sensor, comprising:
    a magnet producing a background field;
    a Hall cell proximate the magnet, the Hall cell providing an output responsive to the background field and a ferrous gear rotating in proximity to the Hall cell; and
    a compensation circuit receiving the Hall cell output, the compensation circuit including
        a subtractor having first and second inputs and an output, wherein the first input is coupled to the Hall cell output;
        a comparator having first and second inputs and an output, wherein the first input receives a signal corresponding to a signal from the subtractor output;

a logic circuit having first and second inputs and an output, the first input receiving a clock signal and the second input receiving a signal from the subtractor ouput;

a counter receiving a signal from the logic circuit output; and a digital-to-analog circuit converting a digital count value from the counter to an analog value provided to the second input of the subtractor.

11. The sensor according to claim 10, further including an amplifier for amplifying a signal from the output of the subtractor.

12. The sensor according to claim A, further including a flip-flop circuit coupled to the comparator output.

13. A method of extracting a signal, comprising:

receiving a Hall cell output voltage, which includes a first component corresponding to a background field from a magnet and a second component corresponding to rotations of a ferrous gear proximate the Hall cell;

generating a steady state compensation voltage using a counter, wherein the compensation voltage corresponds to the background field; and subtracting the compensation voltage from the Hall cell output voltage.

14. The method according to claim 13, further including converting a digital value in the counter to an analog value.

15. The method according to claim 13, further including generating an increasing compensation voltage until reaching the steady state by comparing a difference of the compensation voltage and the Hall cell output voltage with a predetermined threshold voltage.

16. A method of providing a Hall sensor, comprising:

securing a Hall cell to a magnet; and coupling a compensation circuit to the Hall cell, the compensation circuit generating a steady state compensation signal corresponding to a background field of the magnet that is subtracted from an output of the Hall cell, wherein the compensation circuit includes a counter circuit for providing the compensation signal by counting until the compensation signal reaches a level corresponding to the background field.

* * * * *

UNITED STATES PATENT AND TRADEMARK OFFICE
CERTIFICATE OF CORRECTION

PATENT NO. : 6,690,155 B2
DATED : February 10, 2004
INVENTOR(S) : Ravi Vig et al.

It is certified that error appears in the above-identified patent and that said Letters Patent is hereby corrected as shown below:

Column 4,
Line 23, delete "low levels" and replace with -- low level --.
Line 26, delete "dc" and replace with -- DC --.

Column 5,
Line 45, delete "dc" and replace with -- DC --.

Column 7,
Line 13, delete "Claim A" and replace with -- Claim 10 --.

Signed and Sealed this

Twenty-ninth Day of June, 2004

JON W. DUDAS
*Acting Director of the United States Patent and Trademark Office*